United States Patent
Kuepper et al.

(10) Patent No.: US 6,425,556 B1
(45) Date of Patent: Jul. 30, 2002

(54) CONTROL AND/OR SIGNALING DEVICE FOR MOUNTING IN THE MOUNTING BORE OF A MOUNTING PLATE

(75) Inventors: Wilfried Kuepper, Bad Neuenahr-Ahrweiler; Angela Hilgers, Alfter, both of (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/509,380

(22) PCT Filed: Jul. 21, 1999

(86) PCT No.: PCT/EP99/05191
§ 371 (c)(1),
(2), (4) Date: Mar. 23, 2000

(87) PCT Pub. No.: WO00/05794
PCT Pub. Date: Feb. 3, 2000

(30) Foreign Application Priority Data

Jul. 23, 1998 (DE) .......................... 198 33 093

(51) Int. Cl.$^7$ ................................. F16L 5/00
(52) U.S. Cl. ........................ 248/56; 248/27.1
(58) Field of Search ............ 248/27.1, 56, 57; 174/65 SS, 153 G

(56) References Cited

U.S. PATENT DOCUMENTS

| | | | |
|---|---|---|---|
| 3,285,551 A | * | 11/1966 | Tschanz ...................... 248/56 |
| 3,846,736 A | | 11/1974 | Muz ........................... 439/553 |
| 4,035,597 A | | 7/1977 | Josemans ..................... 200/296 |
| 4,312,558 A | * | 1/1982 | Duerr et al. ............... 248/27.1 |
| 5,322,254 A | * | 6/1994 | Birkmeier ................. 248/231.9 |
| 5,866,853 A | * | 2/1999 | Sheehan .................. 174/65 SS |
| 5,911,790 A | * | 6/1999 | Bates et al. ................ 74/502.4 |
| 5,981,877 A | * | 11/1999 | Sakata et al. ........... 174/153 G |

FOREIGN PATENT DOCUMENTS

| DE | 28 16 208 | 10/1979 |
|---|---|---|
| DE | 32 37 589 | 4/1984 |

* cited by examiner

*Primary Examiner*—Leslie A. Braun
*Assistant Examiner*—Gwendolyn Baxter
(74) *Attorney, Agent, or Firm*—Kenyon & Kenyon

(57) ABSTRACT

A control and/or signaling device including a housing member and a head member, and which is intended for mounting in the mounting bore of a mounting plate, a mounting wall or a like smaller than the head in the vicinity of the head. The housing member so that the control and/or signaling device can be attached through a nut member and using only one hand. To this end, a resilient flexible material is placed in the transition area between the cylindrical housing and the head member wherein this flexible mass is applied according to a dual-component injection-moulding method. The housing member and the head member are made of hard resilient material that has a sealing function as well as fixation function optimised by rib-shaped segments.

12 Claims, 2 Drawing Sheets

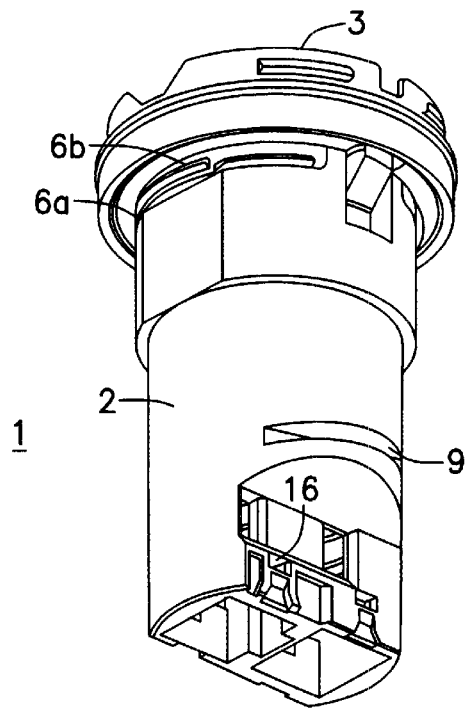
Fig. 1
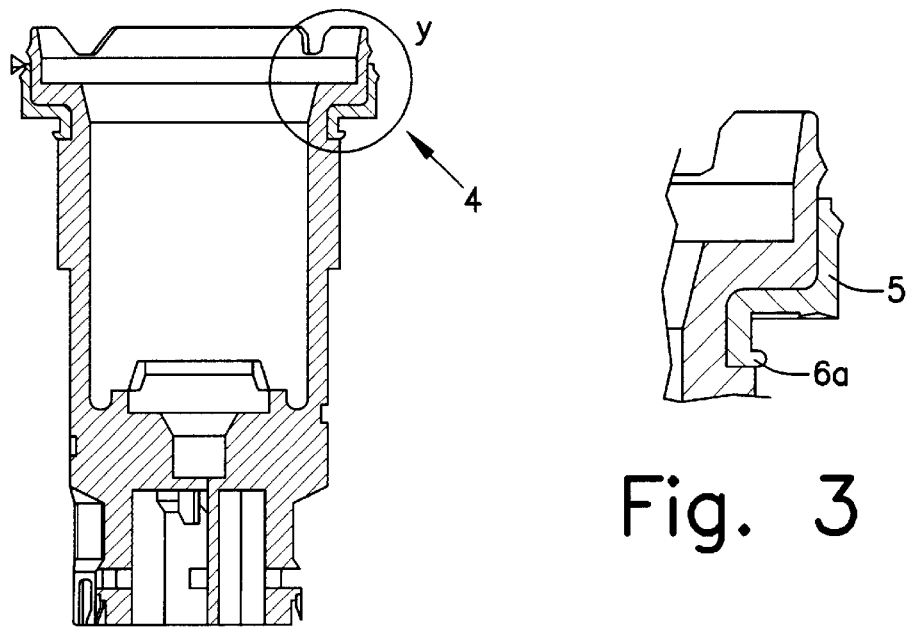
Fig. 2
Fig. 3

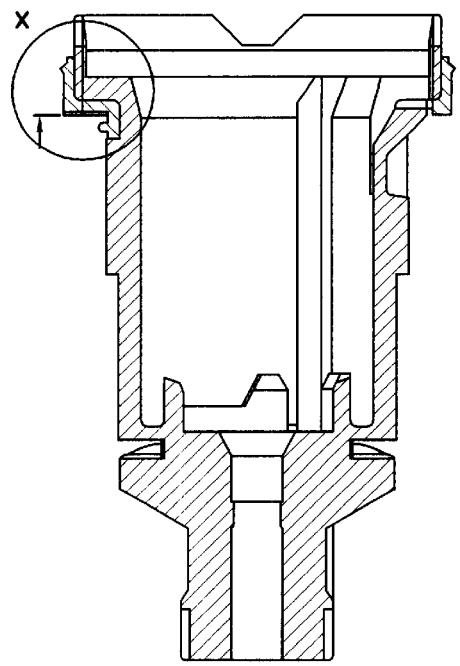
Fig. 4
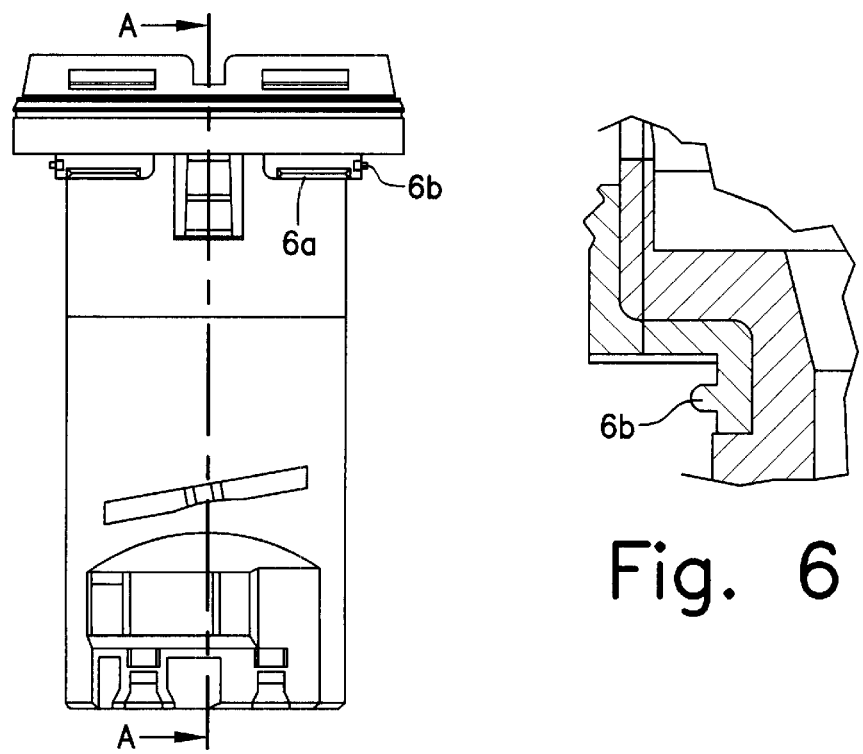
Fig. 5
Fig. 6

CONTROL AND/OR SIGNALING DEVICE FOR MOUNTING IN THE MOUNTING BORE OF A MOUNTING PLATE

FIELD OF THE INVENTION

The present invention relates to a control and/or signaling device including a housing part and a head part for mounting in a mounting bore of a mounting plate and being secured with a nut part definition.

RELATED TECHNOLOGY

Control and/or signaling devices are usually provided with a threaded part and a nut part.

German Patent No. 3237589 C2, for example, describes a signaling device mounted with a nut part.

Two hands are needed to mount such control and/or signaling devices. While one hand holds the device securely, the nut part is screwed on with the other hand. An object of the present invention is to provide a control and/or signaling device including a housing part and a head part for mounting in a mounting bore of a mounting plate and being secured with a nut part where mounting is simplified by permitting mounting with one hand.

BRIEF DESCRIPTION OF THE DRAWINGS

The present invention provides a control and/or signaling device for mounting in a mounting bore, the device including a head part including a first hard elastic plastic material, the head part being larger than the mounting bore, and a housing part including a second hard elastic plastic material and including an outside thread in the vicinity of the head part so as to enable the control and/or signaling device to be secured with a nut part, the housing part being smaller than the mounting bore. The device also includes a flexible material disposed in a transition area between the housing part and the head part, the flexible material for forming a seal with the mounting bore, the flexible material including at least one rib-shaped segment for helping to secure the control and/or signaling device.

On the basis of the drawings, the present invention an, additional embodiments of and improvements on the present invention, and other advantages will be described and explained in greater detail.

FIG. 1 shows a perspective view of the control and/or signaling device;

FIG. 2 shows a first sectional diagram of the control and/or signaling device;

FIG. 3 shows an enlarged sectional diagram of the head area of the control and/or signaling device according to FIG. 2;

FIG. 4 shows a second sectional diagram of the control and/or signaling device;

FIG. 5 shows a side view of the control and/or signaling device;

FIG. 6 shows an enlarged sectional diagram of the head area of the control and/or signaling device according to FIG. 4.

DETAILED DESCRIPTION

FIG. 1 shows a control and/or signaling device 1 for mounting in a mounting bore of a mounting plate, mounting wall or the like.

Control and/or signaling device 1 includes a housing part 2 and a head part 3 which are labeled with the respective reference numbers in FIG. 1.

The mounting bore is smaller than the head part and larger than the housing part. Housing part 2 has two chord-like notches 9 for fastening with a U-shaped holding part (not shown in detail) near terminal clamps 16, as shown in FIG. 1.

A flexible material 5 is arranged in transition area 4 between cylindrical housing 2 and cylinder disc-shaped head part 3, the material being applied by a two-component injection molding method, whereas housing part 2 and head part 3 are made of hard elastic plastic compound.

Flexible material 5 has, in addition to the actual sealing function, a securing function which is optimized by rib-shaped segments 6a, 6b.

Segments 6a are integrally molded radially on the outside, and are interrupted at regular intervals just below head part 3. In the area of these interruptions is arranged a second row of segments 6b, but this is arranged closer to head part 3 and is offset vertically.

In mounting control and/or signaling device 1, segments 6a or 6b press against the edge of the mounting bore in such a way that the nut part can be tightened using one hand without having to hold control and/or signaling device 1 with the other hand.

List of reference numbers

Control and/or signaling device 1

Housing part 2

Head part 3

Transition area 4

Flexible material 5

Segments 6a, 6b

Notches 9

Terminal clamps 16

What is claimed is:

1. A device for mounting in a mounting bore, the device comprising:
   a head part including a first hard elastic plastic material, the head part adapted to be larger than the mounting bore;
   a housing part including a second hard elastic plastic material and including an outside thread in a vicinity of the head part so as to enable the device to be secured with a nut part, the housing part adapted to be smaller than the mounting bore; and
   a flexible material disposed in a transition area between the housing part and the head part, the flexible material for forming a seal with the mounting bore, the flexible material including at least one rib-shaped segment for helping to secure the device.

2. The device as recited in claim 1 wherein the mounting bore is defined by at least one of a mounting plate and a mounting wall.

3. The device as recited in claim 1 wherein the flexible material is applied using a two-component injection molding process.

4. The device as recited in claim 1 wherein the housing part is cylindrical.

5. The device as recited in claim 1 wherein the at least one rib-shaped segment includes at least one first segment forming a first row integrally molded radially at an outside surface of the flexible material and disposed adjacent to the head part and interrupted at regular intervals so as to form interruptions.

6. The device as recited in claim 5 wherein the at least one rib-shaped segment includes at least one second segment forming a second row, a respective at least one of the at least one second segment being respectively disposed in a respective area of the interruptions, the second row being disposed closer to the head part and being offset relative to the first row.

7. A device mountable in a mounting bore, comprising:
   a head part formed of hard elastic plastic material, the head part adapted to be larger than the mounting bore;
   a housing part formed of hard elastic plastic material and including an outside thread in a vicinity of the head part so that the device is securable with a nut part, the housing part adapted to be smaller than the mounting bore; and
   a flexible material disposed in a transition area between the housing part and the head part, the flexible material adapted to be configured to form a seal with the mounting bore and including at least one rib-shaped segment configured to secure the device.

8. The device according to claim 7, wherein the mounting bore is formed in at least one of a mounting plate and a mounting wall.

9. The device according to claim 7, wherein the flexible material is configured to be applied by two-component injection molding.

10. The device according to claim 7, wherein the housing part is cylindrical.

11. The device according to claim 7, wherein the at least one rib-shaped segment includes at least one first segment forming a first row integrally molded radially at an outside surface of the flexible material and disposed adjacent to the head part and interrupted at regular intervals so as to form interruptions.

12. The device according to claim 11, wherein the at least one rib-shaped segment includes at least one second segment forming a second row, a respective at least one of the at least one second segment being respectively disposed in a respective area of the interruptions, the second row being disposed closer to the head part and being offset relative to the first row.

* * * * *

UNITED STATES PATENT AND TRADEMARK OFFICE
CERTIFICATE OF CORRECTION

PATENT NO. : 6,425,556 B1
DATED : July 30, 2002
INVENTOR(S) : Wilfried Kuepper et al.

It is certified that error appears in the above-identified patent and that said Letters Patent is hereby corrected as shown below:

Column 1,
Line 9, change "with a nut part definition." to -- with a nut part. --.
Line 18, change "the other hand. An object of" to -- the other hand. ¶ SUMMARY OF THE INVENTION --.
Line 40, change "and/or signaling device." to -- An object of and/or signaling device. ¶ BRIEF DESCRIPTION OF THE DRAWINGS --.

Column 2,
Line 10, change "of hard elastic" to -- of a hard elastic --.
Line 27, align to the left "Control and/or signaling device 1".
Line 45, change "housing part adapted to be smaller" to -- housing part being smaller --.

Signed and Sealed this

Eighteenth Day of January, 2005

JON W. DUDAS
*Director of the United States Patent and Trademark Office*